March 29, 1960  D. A. KOHL  2,930,525
OPTICAL INTEGRATOR
Filed Nov. 22, 1955  3 Sheets-Sheet 2
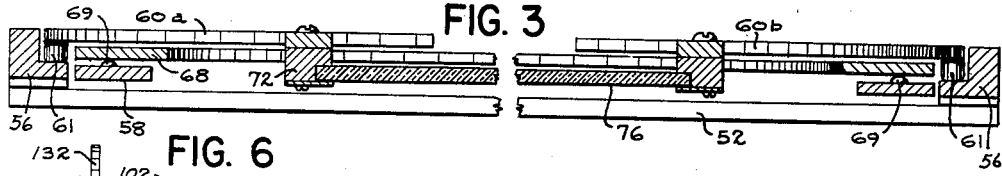
FIG. 3
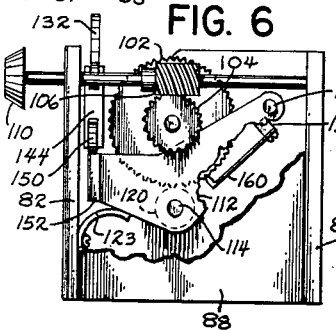
FIG. 6
FIG. 4
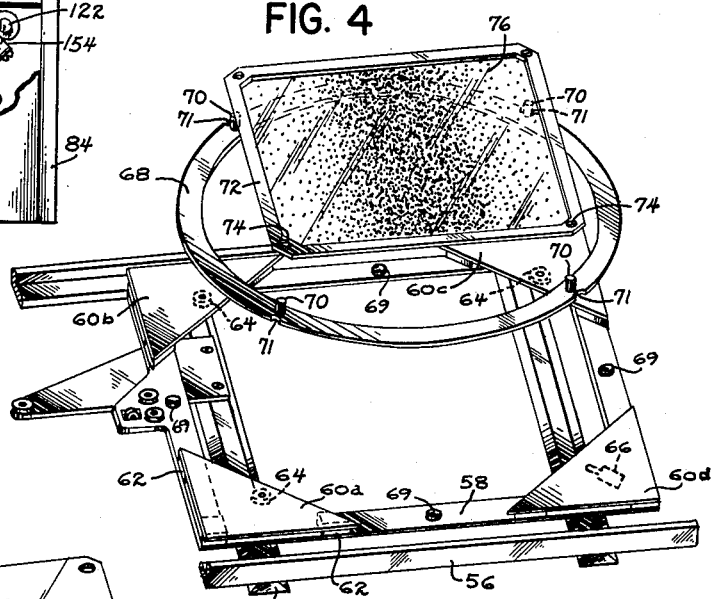
FIG. 5
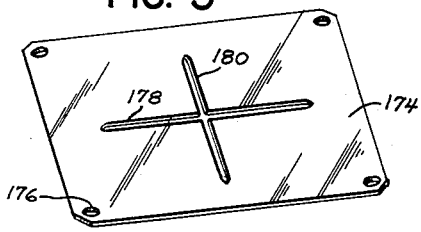
FIG. 7
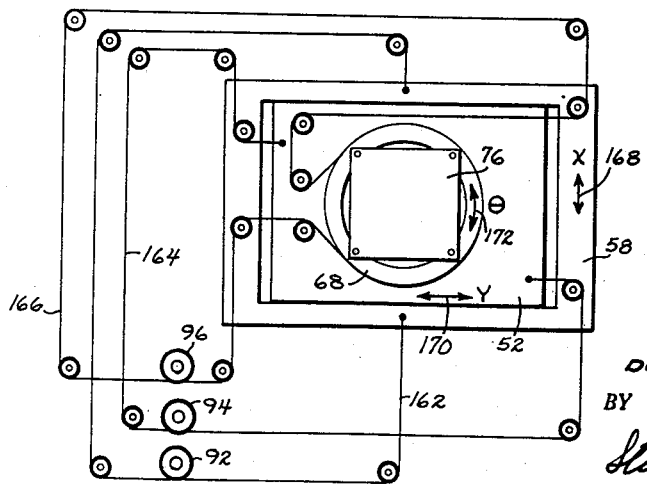
INVENTOR.
DOUGLAS A. KOHL
BY
Stuart R. Peterson
ATTORNEY March 29, 1960 D. A. KOHL 2,930,525
OPTICAL INTEGRATOR
Filed Nov. 22, 1955
3 Sheets-Sheet 3
FIG. 10
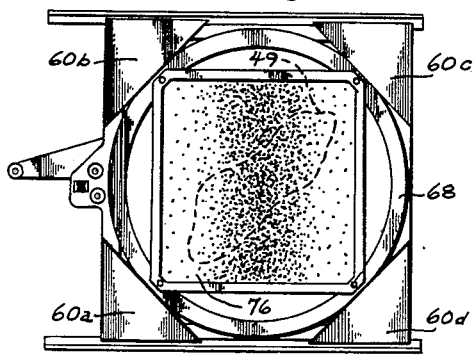
FIG. 9
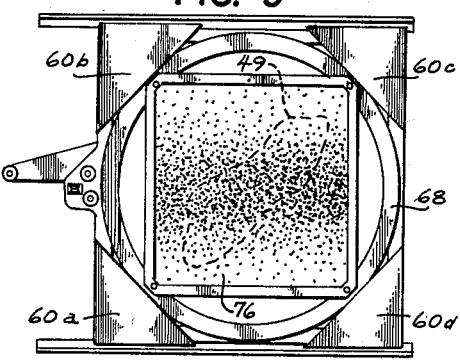
FIG. 11
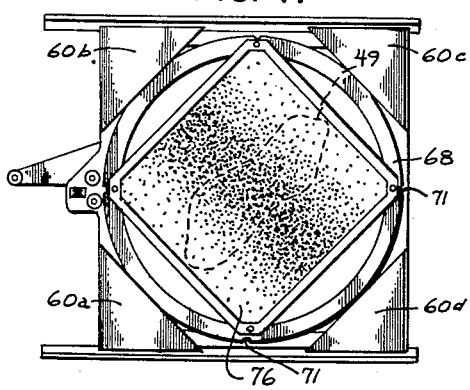
FIG. 12
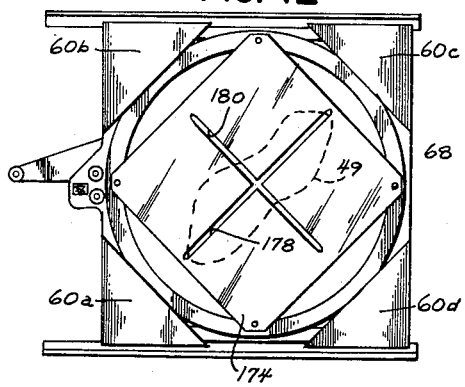
FIG. 8
|   | PULLEY DRUM NO. | | |
|---|---|---|---|
|   | 92 | 94 | 96 |
| X | ✓ | ✓ | ✓ |
| θ | 0 | 0 | ✓ |
| Y | 0 | ✓ | ✓ |
| θ | 0 | 0 | ✓ |
| LOCK | 0 | 0 | 0 |
INVENTOR.
DOUGLAS A. KOHL
BY
Stuart R. Peterson
ATTORNEY United States Patent Office 2,930,525
Patented Mar. 29, 1960

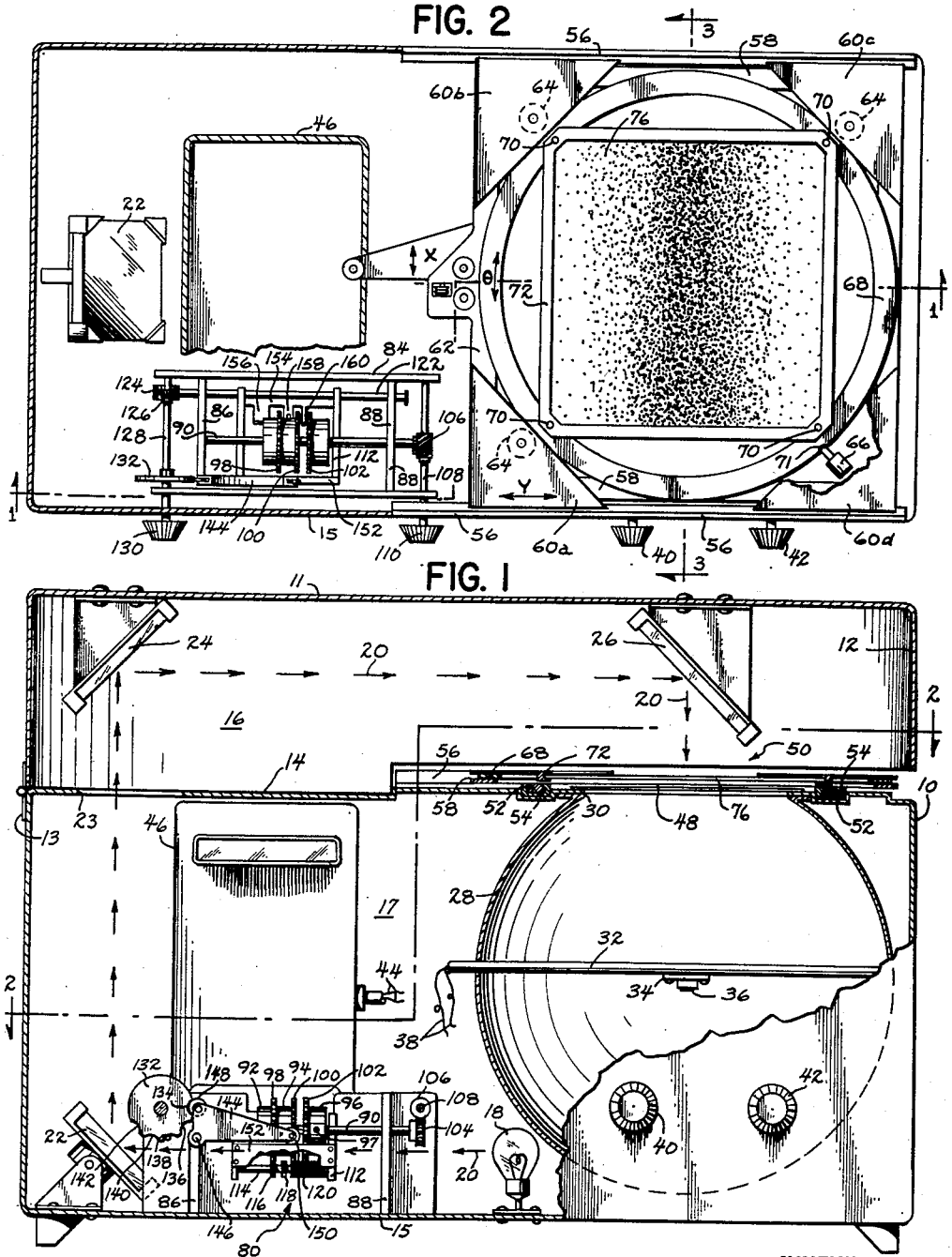

2,930,525

OPTICAL INTEGRATOR

Douglas A. Kohl, Osseo, Minn., assignor to General Mills, Inc., a corporation of Delaware Application November 22, 1955, Serial No. 548,340

7 Claims. (Cl. 235—61.6)

This invention relates generally to measuring devices and pertains more particularly to optical apparatus for determining the areas and other related geometric properties of plane sections having any given shape.

In solving structural problems it is often necessary to know the moment of inertia of a bending section about its neutral axis for use in the formula $$S = \frac{My}{I}$$

By definition, the neutral axis is that about which the moment of inertia is the least for a given orientation of the section. Unfortunately, except for some simple geometric figures, the moment of inertia has not been susceptible of easy determination. For instance, it has been a common practice to approximate an irregular section by sections of known geometrical form, determine the section property of each section about some arbitrary axis, combine the results and translate the final result to a new axis which is determined by a similar process.

If, after completing the above process, the assumed area does not have the proper section, as determined independently by loading and material strength considerations, modifications must be made and the process continued until sufficiently close agreement is reached. If bending takes place about an angle inclined to the arbitrary axis chosen, the product of inertia must be calculated and the determined property rotated by mathematical means. Often inaccuracies, mainly overdesign, are tolerated, but only because of the time involved in making each successive approximation. In the design of structural aircraft parts, for example, it can well be appreciated that extra weight is incorporated into designs unless the foregoing tedious procedure is religiously followed. Also, calculations have in the past been subject to error because of the series procedure utilized.

Accordingly, one object of the invention is to provide a device capable of achieving the foregoing ends in a quick and facile manner. Included in these achievements are the measuring of area, first moment, moment of inertia, neutral and principal axes, "Y" distance from neutral axis to outer fibre and also polar moment.

Another object of the invention is to provide a device of the character referred to which is versatile in nature to such an extent that it may be used without modification in the determination of other geometrical data and with slight modification, through the use of accessory equipment, in the ascertainment of still other dimensional information having integrals of the type $\iint f(x, y)dxdy$. It may also be used, therefore, to solve various mathematical problems which are representable by the geometrical properties of plane areas.

A further object is to provide optical integrating apparatus that is simple to operate, permitting relatively inexperienced personnel to make the necessary manipulations without likelihood of error. Also, it is planned that apparatus constructed in accordance with the teachings of the invention will be of comparatively low cost and quite compact, thereby inducing general acceptance and widespread use of the equipment, even in small offices or computing laboratories.

Still another object of the invention is to provide an optical integrating device possessing a relatively high degree of accuracy.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a front elevational view of the entire optical integrator, largely in section, and which section is taken along the line 1—1 of Fig. 2;

Fig. 2 is a top plan view, partly in section with the section being taken generally in the direction of line 2—2 of Fig. 1;

Fig. 3 is an enlarged sectional view of the carriage mechanism on which the function plate is carried, the view being taken in the direction of line 3—3 of Fig. 2;

Fig. 4 is an exploded perspective view of the parts pictured sectionally in Fig. 3;

Fig. 5 is a perspective view of a scribing template to be substituted for the function plate after having first obtained a proper orientation of said function plate;

Fig. 6 is a right hand end view of the carriage adjusting mechanism visible in Figs. 1 and 2;

Fig. 7 is a schematic view of the pulley arrangement by means of which the carriage mechanism is moved into its rectilinear and rotative paths;

Fig. 8 is a tabulation illustrating the particular pulleys that are driven in order to obtain the rectilinear and rotative motions mentioned above;

Figs. 9, 10, 11 and 12 portray various procedural steps employed in operating the apparatus.

Referring now in detail to the drawings, the optical integrator pictured for the purpose of exemplifying the teachings of the invention comprises a housing 10 having a top 11 provided with downwardly directed sides 12, thus forming a hood which is hinged at 13 so as to allow access to the subjacent traversing mechanism described hereinafter. The lower portion of the housing 10 is provided with a substantially horizontal partition 14 and also includes a bottom or floor 15. By so designing the integrator it will be recognized that there is provided an upper compartment 16 and a lower compartment 17.

Disposed within the lower compartment 17 is a light source 18 and for convenience in tracing the path in which the light emanates from the source 18, a plurality of sequential arrows 20 indicating the exact direction in which the beam extends has been employed. In this regard, it is to be observed that the beam indicated by the numeral 20, bent so as to reduce the overall size of the device, first impinges upon a slanting mirror 22 and then is directed upwardly through an opening 23 in the horizontal partition 14 so that it then strikes a slanting mirror 24. After it is reflected from the mirror 24 the beam proceeds along a horizontal path until it impinges upon a third mirror 26 and it is then directed downwardly into a sphere 28 having an opening or port 30 in its upper portion. In this way, satisfactorily uniform light flux is obtained over a large area by disposing the light source at such a distance that variation by the well known inverse square law is suitably small. Stretched across the port is a very thin white diffusing membrane to intercept and scatter the incident light throughout the interior of the sphere. Similarly, the interior of the sphere is painted flat white so that a maximum amount of nonspecular reflection may be obtained from the sphere's inner wall.

Extending diametrically across this sphere is a rod or tube 32 supporting a bracket 34 on which is mounted a photovoltaic cell 36, this cell being mounted substantially at the center of the sphere in a downwardly facing direction so as to receive only light diffused from the sphere's whitened interior surface. In addition to supporting the photocell 36 the tube 32 affords a convenient means for carrying a pair of electrical conductors 38 which are shown projecting from this tube. These conductors 38 are in circuit with a photometric bridge (not shown). However, it may be pointed out that this photometric bridge does include a calibrating potentiometer for a compensating photocell and also a potentiometer for calibrating the function index plate with a standard area. To this end, a knob 40 is provided by which the compensating calibration may be effected and a knob 42 is provided by which the function index can be calibrated with a standard area. It is believed that the need for the function index calibration will become more apparent as the description progresses. Further conductors 44 which are actually in the same photometric bridge circuit with the conductors 38 provide an electrical path to a galvanometer 46. By reason of the wide range galvanometer 46 (null indicator) the balancing of the photometric bridge may be achieved in a rather rapid fashion.

Placed over the opening or port 30 is a mask 48 having a cut-out area 49 proportional to the structural element, the moment of inertia or other function of which is to be determined. This mask may be held fast in a number of ways, such as by the simple expedient of taping it securely. The irregular contour of the area 49 is best viewed in Figs. 9, 10, 11 and 12.

Superimposed above the opening or port 30 in the sphere 28, and of course the mask 48, is a traversing mechanism designated in its entirety by the reference numeral 50. The traversing mechanism 50 includes a pair of transversely extending tongues or ribs 52 slidably received in complementary configured grooves or tracks 54 carried on the partition 14. By virtue of the tongue and groove arrangement thus afforded, the traversing mechanism 50 is capable of being moved forwardly and rearwardly with respect to the optical integrator housing 10.

In order to permit the traversing mechanism 50 to be moved longitudinally relative to the housing 10, a pair of angled tracks 56 are mounted transversely upon ribs 52, these tracks being of sufficient length so that the traversing mechanism 50 may be moved over the effective length of the opening 30. Cooperating in the achieving of this longitudinal movement, is a rectangular frame 58, having fixed thereto triangular gussets 60a, 60b, 60c, and 60d, there being a plurality of spacer elements 62 by which these gussets are mounted to the rectangular frame 58 and maintained in a slightly spaced relation with respect to said frame. From Fig. 3 it will be observed that the triangular gussets 60 overhang the angled tracks 56 slightly and disposed on the under surface of the overhanging marginal portions of these gussets is a plurality of nylon buttons 61 which ride upon the tracks 56. In this way, a good sliding action is provided between the gussets 60 and the track members 56. The gussets 60a, 60b, and 60c are equipped with rollers 64 and the gusset 60d is provided with a spring pressed detent 66, the purpose of which will become manifest hereinafter.

A turning ring 68 is mounted so that its lower face bears against further nylon buttons 69 mounted on the rectangular frame 58. The peripheral edge of the turning ring 68, however, is disposed so as to bear against the rollers 64 carried by the gussets 60a, 60b, and 60c. Also constraining the turning ring 68 against any radial displacement is the spring pressed detent 66 mentioned above. Since, as will become clearer later on, the turning ring 68 is to be rotated into preferred angular positions, a plurality of notches 71 are quadrantly spaced to permit the spring pressed detent 66 to engage therein so that the operator can conveniently ascertain when the appropriate rotative position has been reached. Upright posts, also quadrantly spaced, are disposed on the upper face of the turning ring 68, these posts having been given the reference numeral 70.

A function plate frame 72 is provided with a number of apertures 74, which are of a size so as to snugly encircle the upstanding posts 70, thereby releasably maintaining the function plate frame in a fixed relationship with the turning ring 68 so that rotation of the turning ring will cause concomitant rotation of the function plate frame 72. As the name given to the frame 72 indicates, the purpose of this frame is to mount a function plate 76 therein. More will be said later on concerning the specific attributes of the function plate 76 which will be necessary in obtaining the moment of inertia of the area represented by the numeral 49 and its neutral axis.

In order to obtain both a translatory and rotative motion of the function plate frame 72, a control or adjusting mechanism indicated generally by the numeral 80 is employed. The adjusting mechanism 80 comprises front and back plates 82, 84 and end plates 86, 88. Journalled in the end plates 86, 88 is a longitudinally extending shaft 90 having a plurality of pulley drums 92, 94 and 96 disposed thereon. The pulley drums 92 and 94 freely encircle the shaft 90 but the pulley drum 96 is pinned to the shaft as by a pin element 97 thereby causing the pulley drum 96 to rotate in unison with the shaft 90. Rotatively associated with each of the pulley drums is a gear 98, 100, and 102. Actually these gears may be integral with their respective pulley drums 92, 94 and 96. At any rate, it is to be understood that these gears are operatively connected with the pulley drums so as to either drive the pulley drum or be driven thereby as circumstances dictate.

In order to rotate the shaft 90, this shaft is provided with a worm gear 104 at one end thereof, this worm gear being in a meshed or driven relationship with a worm 106 carried on a transverse shaft 108. By reason of a knob 110, the shaft 108 may be rotated so as to produce rotative motion of the longitudinal shaft 90.

Swingingly disposed is a yoke 112 journaling a shaft 114 having integral therewith three pinion sections 116, 118, and 120. The swinging disposition of the yoke 112 is obtained by virtue of a rod 122 fixedly connected to the yoke 112. The rod 122 is slidably mounted with respect to the mechanism 80 by having portions thereof project through the end plates 86 and 88. However, the rod 122 is only longitudinally slidable, there being suitable keying means thereon so that no rotation of this rod 122 is possible. The actual swing of the yoke 112 is effected by having apertures in the yoke which freely encircle the rod to permit the desired pivotal movement of the yoke. A curved leaf spring 123 (Fig. 6) biases the yoke 112 in a direction to effect engagement of the pinions with the gears 98, 100, and 102.

One end of the longitudinally slidable rod 122 is provided with a gear rack 124 which is meshed with a pinion 126 rotatively carried on a traverse shaft 128. By means of a motion selector knob 130 the shaft 128 may be turned so as to cause the gear rack 124, through the agency of the pinion 126, to be longitudinally displaced thus causing corresponding displacement longitudinally of the swingable yoke 112. Since the shaft 114 is carried by the yoke 112, it will, of course, be appreciated that the pinion elements 116, 118 and 120 on the shaft 114 will likewise be displaced in a longitudinal direction.

Keyed for rotation with the transverse shaft 128 is a notched wheel 132 having a plurality of notches 134, 136, 138, 140 and 142 formed in its periphery. Coacting with the various notches above mentioned is a cam member 144 pivotally mounted by means of a pin 146 to to a stationary element such as the end plate 86. The cam member 144 carries a follower roller 148 which is enageable in any of the notches 134, 136, 138, 140, and 142. However, when the roller 148 is actuated by promontories or peripheral regions intermediate these various notches then, of course, the roller 148 is actuated so as to move the cam member 144 through an arc in a clockwise direction. At the distal end of the cam member 144 is an actuating roller 150 which rides against a follower plate 152 fixedly mounted on the yoke 112. Consequently, whenever the notched wheel 132 is rotated by the knob 130 the cam member 144 is responsible for effecting disengagement of whatever pinions 116, 118 and 120 which might be engaged at that particular time with the gears 98, 100 and 102. Concurrently with such disengagement of the gear elements the pinion 126, also on the transverse shaft 128, is rotated by the knob 130 and is instrumental in moving the gear rack 124 so that a certain longitudinal displacement of the pinions 116, 118 and 120 is effected via the yoke 112.

Inasmuch as it is contemplated that the gears 98, 100 and 102 will at certain times have to remain stationary a longitudinal block element 154 is affixed to the yoke 112 and is swingable therewith. Secured to the block element 154 is a series of spring fingers designated by the numerals 156, 158 and 160. The specific role played by these spring fingers will be discussed more fully during the operational sequence to be presented later on. At this time, however, it may be noted that the spring finger 156 is wider than its next adjacent spring finger 158 and this next adjacent spring finger 158 is somewhat wider than the third spring finger 160. Actually the middle finger 158 is bifurcated for a reason that will soon become manifest. By having these various spring fingers of different widths it will be recognized that the spring finger 156 will remain in a locking engagement with its associated gear 98 throughout a longer period of longitudinal displacement of the yoke 112 than will the spring finger 158 and the spring finger 158 in turn remains in a locked relationship with its associated gear 100 longer than does the third spring finger 160 with its associated gear 102.

As can be seen from Fig. 7, the pulley drum 92 has trained thereover a cord or cable 162 which is affixed to some portion of the transversing mechanism 50 such as the rectangular frame 58 so that transverse movement of the traversing mechanism is achieved. The pulley drum 94 similarly has trained thereover a cord or cable 164 having connection with a portion of the traversing mechanism 50 such as one of the members 52 so as to produce a longitudinal motion. The remaining pulley drum 96 has trained thereabout a cord or cable 166 having connection with the turning ring 68.

As an aid to understanding what motions of the traversing or translating mechanism 50 are involved, the various motions have been designated by various arrows. For example, the transverse motion which will be considered in the "X" direction has its arrow labelled 168. Motion in a longitudinal direction which will be considered in the "Y" direction has its arrow designated by the numeral 170 and the rotative direction being designated by the arrow 172 has been indicated by the Greek letter "θ." While the structure for producing these various motions has been presented only schematically in Fig. 7, nonetheless the arrows placed on Fig. 7 also appear in Fig. 2 and thus a ready means of comparison between the structural figures is afforded.

It must be understood that the diagram set forth in Fig. 7 is quite schematic in nature and that in a physical configuration all cables must enter into the frame 58 in parallel fashion to the "X" movement. Thus certain pulleys are fastened to the frame 58 so that "Y" motion of the frame 52 is achieved only when cable 164 moves relative to the frame 58 or cable 162. Similarly, other pulleys on frame 52 and also on frame 58 are such that cable 166 must move relative to frame 52 or cable 164 to achieve rotation. One end of each cable, 162, 164, 166, emerges from one side of frame 58 and the other ends feed into the opposite side. In this fashion it is possible to take in and pay out all cable at the same rate producing the "X" motion without "Y" or "θ" and likewise the respective "Y" and "θ" movements as desired. Also, while the ribs 52 are not, strictly speaking, a frame themselves, they nonetheless comprise an integral portion of what in effect constitutes a frame and hence in the above description of Fig. 7 such a term has been employed for simplicity's sake.

While the need therefor perhaps will not become totally clear at the present, reference is now made to a scribing plate 174, preferably but not necessarily of transparent material such as Plexiglas. From Fig. 5 it will be discerned that this scribing plate is equipped with four apertures 176 having the same spacing as the upstanding posts 70 mounted on the turning ring 68. Hence, once the turning ring 68 has been properly oriented then the function plate frame 72 may be replaced with the scribing plate 174 for the purpose of marking with a pencil the intersecting principal axes on the irregular area 49, slots 178 and 180 being provided in the plate 174 for this reason.

Assuming that it is desired, for the sake of illustration, to determine the center of gravity of the irregular area defined by the contour labelled 49 it will be appreciated that the blank mask material constituting this area is cut and removed from the mask 48 so that light will be permitted to pass through the mask, the amount of which will be in correspondence with the overall area. Having produced the mask 48 it is taped or otherwise secured over the port 30 of the integrating sphere 28.

Also, there is prepared the function plate 76, this function plate being of variable light absorption density such that the amount of light that will pass therethrough will be in accordance with the function to be evaluated. Here it is proportional to the square of the distance that the light so passing is from a datum line or axis. In this particular case, the function plate transmission density variation is to be symmetrical about the datum line (centerline of the plate) so that the galvanometer will read the moment of inertia of the area 49 directly.

When the function plate 76 is properly prepared, it is mounted in the frame 72 and this frame is placed upon the turning ring 68, the apertures 74 fitting snugly about the upstanding posts 70. For the sake of discussion, reference should now be had to Fig. 9. In first placing the function plate 76 into position, we will assume that this function plate is farther towards the drawing's upper edge than that position in which it appears in Fig. 9. With the function plate displaced above its proper central position as stated just above, it will immediately be apparent that more light will pass through the area 49 than when the function plate has been moved toward the drawing's lower edge so that an equal amount of light can pass through those regions on either side of its central or datum line. Thus, to find the location of the axis of the function plate which gives the least second moment, it is necessary, under these assumed conditions, to move the function plate toward the bottom of the drawing, that is, move it in the "X" direction as indicated by the arrow 168. Note that the axis of the function plate is moved in a direction perpendicular to it.

To do this, the notch 134 on the rotatable plate 132 is moved by reason of the knob 130 so that it is brought into juxtaposition with the follower roller 148. Concurrently with this happening, the rotation of the knob 130 is instrumental in rotating the pinion 126 and because of its meshed relationship with the gear rack 134, the entire yoke 112 is displaced to the right so that it assumes the position pictured in Fig. 1. When so positioned, it will be noted that the pinions 116 and 120 are in engagement with the gears 98, 100 and 102, the pinion 120 being of such length that it is capable of engaging both the gears 100 and 102. When the carriage is so positioned, the spring 123 is responsible for maintaining meshed relationship between these particular pinions and gears 98, 100 and 102. This prepares the way for rotation of the knob 110. Turning of the knob 110 causes the pulley drum 96 to move with the shaft 90 inasmuch as this pulley drum is fixed to the shaft by virtue of the pin 97. Owing to the connected relationship between the pulley drum 96 and its gear 102, the gear 102 proceeds to rotate and its rotation causes a driven rotation of the pinion 120. Not only does the pinion 120 rotate, but it in turn causes rotation of the gear 100 and its pulley drum 94. Further, since the pinion 116 is at this time engaged with the gear 98, the gear 98 also rotates and together with this gear 98 the pulley drum 92 turns. It is the rotation of the pulley drum 92 that is responsible for producing the "X" direction designated by the arrow 168. At this particular time, it is not desired to have other movements such as the "Y" or "θ" motions take place. Accordingly, in this particular position of the yoke 112 the pulley drums 94 and 96 merely pay out their associated cords or cables 164 and 166 so that these other motions do not occur. Consequently, only a rectilinear motion in the "X" direction is achieved, this happening when all of the gears 98, 100 and 102 are rotated.

After moving the function plate 76 toward the bottom of the drawing so as to produce the relationship depicted in Fig. 9, then it is necessary to rotate the turning ring 68 so as to reorient the function plate through 90°. In order to do this, the knob 130 is again turned so as to bring the notch 136 into juxtaposition with the follower roller 148. The peripheral region or promontory of the wheel 132 lying intermediate the notches 134 and 136 is instrumental in pivoting the cam member 144 in a clockwise direction to such an extent that the follower plate 152 is urged downwardly due to the action of the roller 150. This, of course, disengages the pinions 116 and 120 that have heretofore been engaged with the gears 98, 100 and 102. Concurrently with this operation, the pinion 126 urges the gear rack 24 to the right as viewed in Fig. 2 so as to displace the entire yoke 112 farther to the right. Such displacement toward the right causes portions of the spring fingers 156 and 158 to engage the gears 98 and 100 respectively. Due to this locking engagement, these particular gears cannot rotate and, of course, there can be no rotation of their associated pulley drums 92 and 94. However, the gear 102, due to its engagement with the pinion 120, which pinion 120 has been moved sufficiently to the right so as to cause its disengagement from the gear 100, cannot drive either of the gears 98 or 100; this is attributable to the fact that while the pinion 120 has become disengaged from the gear 100 the pinion element 116 also has been disengaged from its gear 98 and at the same time the pinion 118 has not as yet established a driving connection with the gear 100.

Accordingly, rotation of the knob 110 causes the shaft 90 to rotate and, of course, the pulley drum 96. With only the pulley drum 96 rotating, it can be recognized from the schematic representation of Fig. 7 that only the cable or cord 166 is moved and because of this fact the turning ring 68 is moved angularly but not rectilinearly. The direction of rotation, of course, is represented by the arrow 172 and is in the direction "θ." Ninety degrees of rotation will be easily recognized by the clicking sound and resistance encountered by engagement of the detent 66 with the next notch 71.

Having moved the function plate 76 through 90°, we will assume that the function plate is in a position other than the central position shown in Fig. 10. For the sake of discussion, we will assume that the function plate as viewed in Fig. 10 is too far to the left and must be moved toward the right of the drawing sheet to secure a minimum value of the second moment.

To accomplish this particular aim, the knob 130 is manipulated once again so as to move the notch 138 into registry with the roller 148. This action, of course, displaces the yoke 112 further to the right via the meshed relationship provided by the pinion 126 and its gear rack 124. When the yoke 112 is moved further to the right, this movement brings the pinion 118 into engagement with the gear 100 and, of course, the pinion 120 is of sufficient length so as to remain in engagement with the gear 102. Having established this engaged relationship, then manipulation of the knob 110 will cause rotation of the drum 96 together with its gear 102 and by virtue of the geared relationship afforded by the pinion 120 and the pinion 118 the gear 100 is driven together with its pulley drum 94.

This action is responsible for establishing a movement in the "Y" direction as indicated by the arrow 170, the pulley drum 94 causing the actual movement whereas the pulley drum 96 simply pays out the cable 166. Rotation of the knob 110 is, of course, continued until the function plate 76 has been moved into the position pictured in Fig. 10. During this time the locking finger 156 prevents the gear 98 from turning, but the gear 100 is permitted to rotate owing to the bifurcated configuration of the finger 158.

From the foregoing, it will be apparent that the center of gravity has been found by translating the function plate 76 first in one rectilinear path and then in another rectilinear path in an angle with respect thereto while maintaining the axis orientation at right angles to the direction of motion. In both instances, the function plate has been moved so as to effect a minimum reading of the photometric bridge by means of observing the galvanometer deflection.

In determining geometrical measurements of the foregoing type, it is usually desirable to locate further the principal and neutral axes of the particular area undergoing study. Accordingly once having established or determined the center of gravity, rotation of the function plate 76 about its center of gravity will show where the principal axes are located. To do this, the knob 130 is once again rotated so as to bring the notch 140 into juxtaposition with the roller 148. This action causes the yoke 112 to move still farther to the right and results in the disengagement of the pinion 118 from its gear 100. However, a portion of the pinion 120 still remains in engagement with the gear 102 but since this pinion now is no longer engaged with any of the gears and neither is either of the pinions 116 and 118, rotation of the knob 12 causes only the pulley drum 96 to rotate. This rotation of the pulley drum 96 through the agency of the cable 166 causes concurrent rotation of the turning ring 68. When either a maximum or minimum reading is observed on the galvanometer 46 (photometric bridge), depending upon the selection of the operator, the knob 110 is released. Usually, the minimum I about its principal axis is desired. As shown in Fig. 11, the turning ring 68 has been rotated so as to produce a maximum reading on the galvanometer 46 (photometric bridge). At any rate, the maximum or minimum reading will properly orient the function plate 76 so that intersecting lines may be drawn on the mask 48. To accomplish this, the knob is once again rotated, thereby moving the notch 142 into registry with the roller 148 and causing locking engagement of all of the fingers 156, 158 and 160 with the gears 98, 100 and 102. The frame 72 is then removed and in its stead is placed the scribing plate 174. While the area 49 represents a cut-out or removed configuration, nonetheless as can be seen from Fig. 12, the substitution of the scribing plate 174 affords a ready means of marking what would otherwise be intersecting coordinates, there being enough mask material bordering the cut-out so that at least portions of lines can be applied. It is where these coordinates intersect that the center of gravity exists and lines which will be drawn by virtue of the slots 178, 180 will provide the principal axes for the area 49 undergoing study. The photometric bridge will indicate quantative measures of the moments of inertia corresponding to these axes.

Reference to the graphical tabulation constituting Fig. 8 will be of aid in appreciating what pulley drums 92, 94 and 96 are to be rotated in obtaining the "X," "Y" and "θ" motions. The checks in this figure indicate drum movement and the circles indicate drum immobility.

From the foregoing, it will be appreciated that the center of gravity, moment of inertia, and neutral axes can be quickly and readily determined with the optical integrator forming the subject matter of the present invention, thereby obviating heretofore long and tedious approximations. Also, it is believed evident from the preceding discussion that the function plate, if desired, might be mounted directly over the port 30 and when so placed would be in substitution for the mask 48. Then, of course, the mask itself would be carried in the frame 72 and would be rotatable relative to the function plate. Consequently, in summing up it is to be understood that the mask 48, as far as its mounting is concerned, is interchangeable with the function plate 76, all that need be accomplished being that one be relatively rotatable and translatable with respect to the other.

If the transmissivity of other function plates is altered to conform with other mathematical relationships, other useful properties may be quickly determined, e.g., a polar second moment and linear first moment. When the transmission is everywhere uniform the photometric bridge indicates the area of any irregular section with high accuracy.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. In an optical intergrating device in which a pattern element and a function plate element are disposed in a light path, means for generating light directed along said light path, means for supporting one of said elements, first means for supporting the other element for movement in one rectilinear direction relative to said means for supporting said one element, second means for supporting said other element for movement in a rectilinear direction relative to said means for supporting said one element and at an angle to said first rectilinear direction, third means for supporting said other element for rotative movement relative to said first and second supporting means for said other element, said means for supporting said one element and said first, second and third means for supporting said other element all being disposed so that light from said light generating means will pass through said pattern and function plate elements, and light measuring means for providing an indication of the amount of light passing through said elements.

2. The device described in claim 1 in which said rectilinear directions are perpendicular to each other and in which the device further includes detent means for releasably retaining said third means in either of two rotated positions displaced from each other by 90°, said rotated positions corresponding, respectively, to said rectilinear directions.

3. In an optical integrating device, means for fixedly supporting a pattern, first means for supporting a function plate for movement in one rectilinear direction relative to said pattern supporting means, second means for supporting the function plate for movement relative to said first plate supporting means and perpendicularly to said rectilinear direction, third means for supporting said plate for rotative movement relative to said first and second plate supporting means, first, second and third pulley means, a first cable trained over said first pulley means having a driving connection with said first plate supporting means, a second cable trained over said second pulley means having a driving connection with said second plate supporting means, a third cable trained over said third pulley means having a driving connection with said third plate supporting means, a gear drivingly associated with each of said pulley means, means for selectively driving all of said gears, the gears associated with said second and third plate supporting means or only said gear associated with said third plate supporting means, respectively, means for generating light in a path directed in the direction of said pattern and said function plate when mounted on their respective supporting means, and light measuring means for providing an indication of the amount of light transmitted through said pattern and function plate.

4. In an optical integrating device, means for fixedly supporting a pattern, first means for supporting a function plate for movement in one rectilinear direction relative to said pattern supporting means, second means for supporting the function plate for movement relative to said first plate supporting means and perpendicularly to said rectilinear direction, third means for supporting said plate for rotative movement relative to said first and second plate supporting means, first, second and third pulley means, a first cable trained over said first pulley means having a driving connection with said first plate supporting means, a second cable trained over said second pulley means having a driving connection with said second plate supporting means, a third cable trained over said third pulley means having a driving connection with said third plate supporting means, a first gear drivingly connected with said first pulley means, a second gear drivingly connected with said second pulley means, a third gear drivingly connected with said third pulley means, means for engaging said first, second and third gears so as to cause said three gears to rotate in unison to pay out said second and third cables as said first cord effects plate movement in said rectilinear direction, means engageable with said second and third gears to pay out said third cable as said second cable effects plate movement in said perpendicular direction, and means for driving only said third gear to cause said third cable to effect said rotative movement without accompanying movement of said first and second plate supporting means.

5. The device described in claim 4 including means for locking all of said gears against rotation.

6. In an optical integrating device, means for fixedly positioning a first light transmission element, first means for supporting a second light transmission element for movement in one rectilinear direction relative to said first element supporting means, second means for supporting the second light transmission element for movement relative to said first element supporting means and rectilinearly at an angle to said first rectilinear direction, third means for supporting said second light transmission element for rotative movement relative to said first and second supporting means, first, second and third gear members, first pulley means actuated by said first gear member, second pulley means actuated by said second gear member, third pulley means actuated by said third gear member, a first cord trained over said first pulley means having a driving connection with said first supporting means, a second cord trained over said second pulley means having a driving connection with said second supporting means, a third cord trained over said third pulley means having a driving connection with said third supporting means, pinion means, yoke means swingably supporting said pinion means for engagement and disengagement with said gear members, spring means biasing said yoke so as to effect engagement of said pinion means, a notched wheel, cam means engaging said wheel and said yoke means for urging said yoke means in a direction to overcome the action of said spring means to effect disengagement of said pinion means from said gear members, a pinion rotatable with said notched wheel, and a gear rack in mesh with said pinion, said gear rack being mounted to said yoke means for shifting said yoke means and its pinion means longitudinally to effect a meshing of said pinion means with selected gear members.

7. The device described in claim 6 including manual means for rotating said third gear member and in which said notched wheel is equipped with five notches angularly disposed so that when the first notch is in registry with said cam means the pinion means is intermeshed with all of said gear members, when the second notch is in registry with said cam means said pinion means is shifted so that only said third gear member is operated by said manual means, when the third notch is in registry with said cam means said pinion means is intermeshed with said second and third gear members, when the fourth notch is in registry with said cam means said pinion means is shifted so that once again only said third gear member is operated by said manual means, and when the fifth notch is in registry with said cam means said pinion means is shifted so that all of said gear members are disengaged from said pinion means and locked against rotation, said yoke means carrying spring finger means shiftable with said yoke means which spring finger means includes segments thereof engageable with said gear members for locking the disengaged gear members.

References Cited in the file of this patent

UNITED STATES PATENTS

| | | |
|---|---|---|
| 696,877 | Mackintosh | Apr. 1, 1902 |
| 2,301,935 | Ehringhaus | Nov. 17, 1942 |
| 2,398,904 | Libeman et al. | Apr. 23, 1946 |
| 2,415,125 | Davenport | Feb. 4, 1947 |
| 2,701,476 | Keise | Feb. 8, 1955 |
| 2,712,415 | Piety | July 5, 1955 |
| 2,756,930 | Pelsor et al. | July 31, 1956 |